United States Patent [19]

Walker et al.

[11] 4,313,033
[45] Jan. 26, 1982

[54] APPARATUS AND METHOD FOR DIGITAL COMBINATION OF DELTA MODULATED DATA

[75] Inventors: Donald F. Walker, Anaheim; Robert G. Phelps, Fullerton, both of Calif.

[73] Assignee: Hughes Aircraft Company, Culver City, Calif.

[21] Appl. No.: 114,138

[22] Filed: Jan. 21, 1980

Related U.S. Application Data

[63] Continuation of Ser. No. 892,353, May 31, 1978, abandoned.

[51] Int. Cl.³ .................. H03K 13/22; H04J 3/04; H04M 3/56; H04Q 11/04
[52] U.S. Cl. .................. 179/1 H; 179/1 B; 370/62; 370/112; 375/28
[58] Field of Search ............. 179/18 BC, 1 CN, 1 H, 179/1 B, 37, 40; 370/62, 112; 375/28

[56] References Cited

U.S. PATENT DOCUMENTS

| | | | |
|---|---|---|---|
| 3,566,038 | 2/1971 | Slavin | 179/1 B X |
| 3,748,394 | 7/1973 | Thomas | 179/18 BC |
| 3,872,255 | 3/1975 | Nance et al. | 375/28 X |
| 3,883,697 | 5/1975 | Brown | 179/18 BC |
| 3,937,898 | 2/1976 | Presto et al. | 179/18 BC |
| 3,949,298 | 4/1976 | Boxall | 370/112 |

*Primary Examiner*—Thomas W. Brown
*Attorney, Agent, or Firm*—E. N. Kramsky; W. H. MacAllister

[57] ABSTRACT

Apparatus and method for processing sound as delta modulated digital data bits. A speaker console communicates with a listener console through a central switching unit. Tri-state generators within the central switching unit convert bipolar data modulated speaker data to tri-state logic which is then multiplexed onto a bus. The bus is sampled by a plurality of listener modules of a majority detector unit according to desired speaker combinations and a majority output is thereby determined for each time slot. A data generator modifies a bipolar delta modulated idle waveform according to the state of the idle waveform and the historical output of a listener module, incrementing and decrementing a carry register and a borrow register in the data generator to reflect storage, insertion or cancelling of majority "ones" or "zeros". The combining logic of the data generator enables the central switching unit to produce a combined output having the initial speaker data bit rate.

10 Claims, 9 Drawing Figures

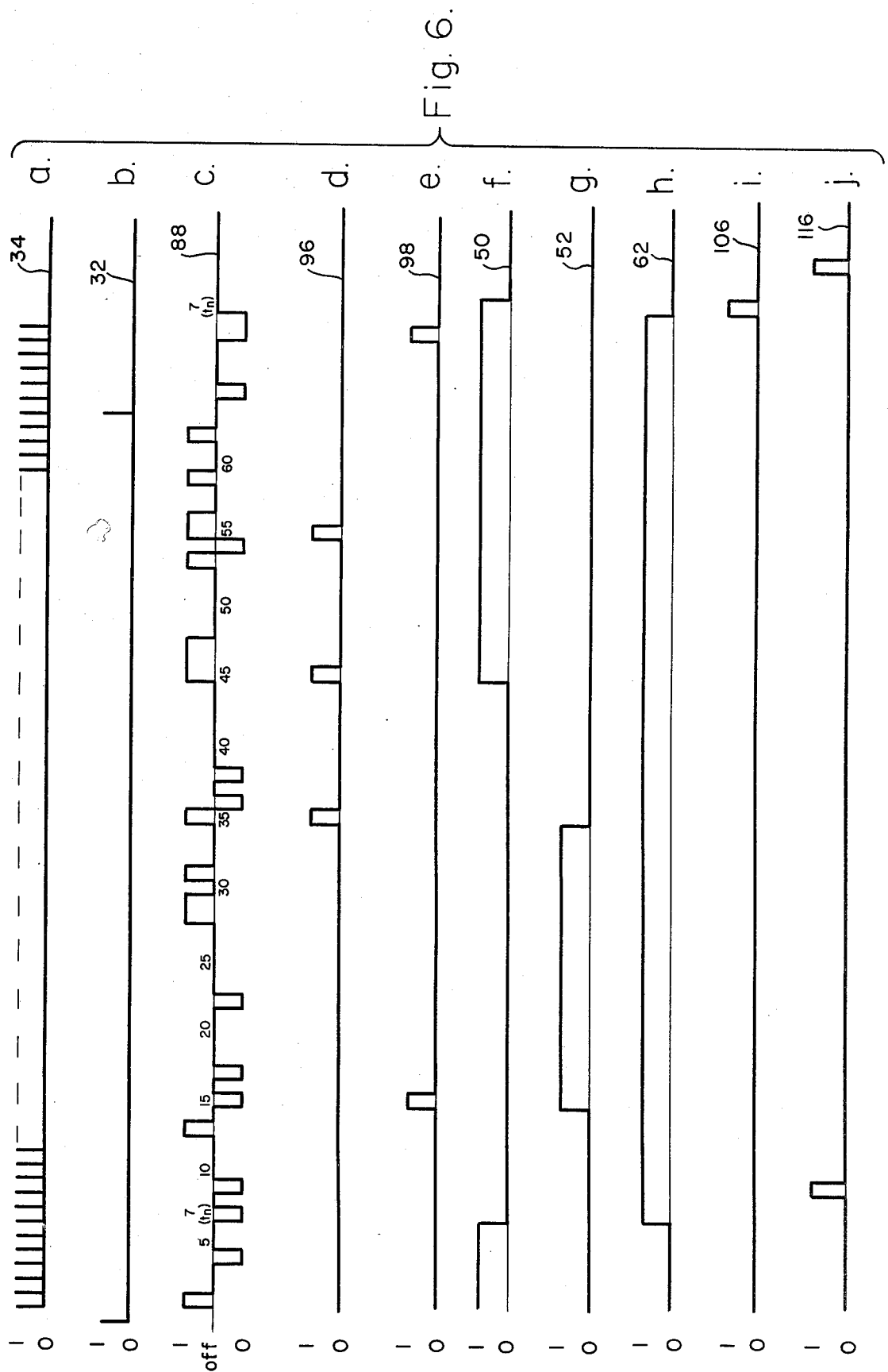

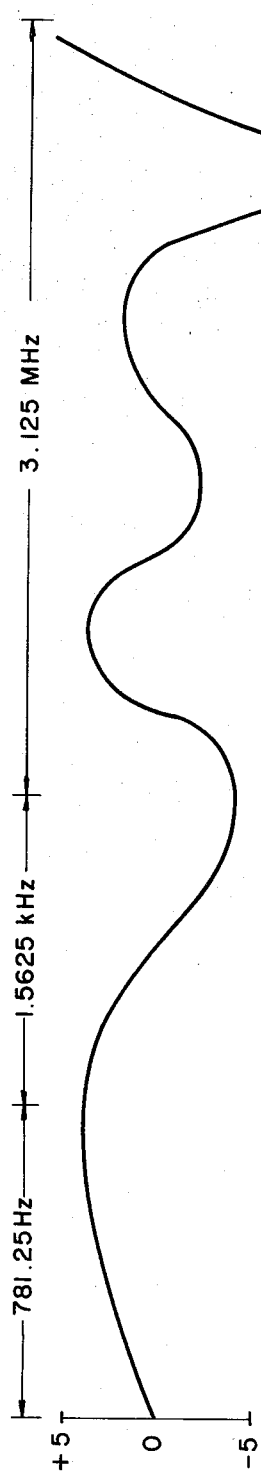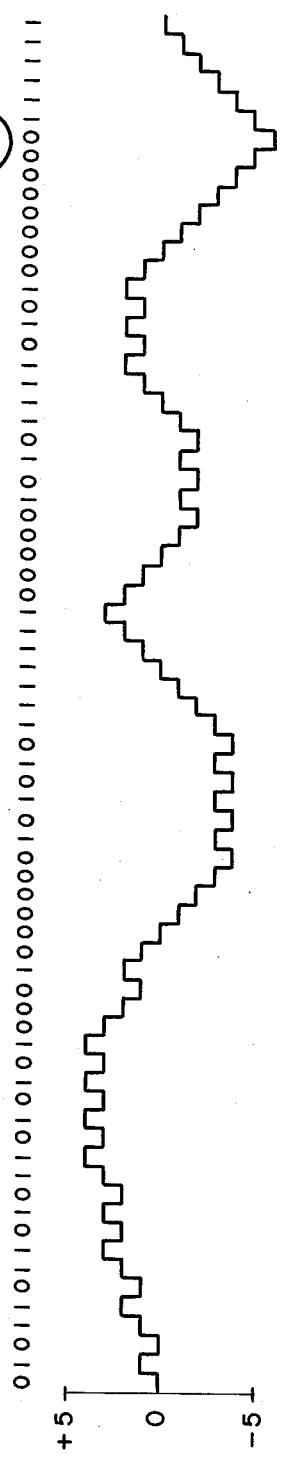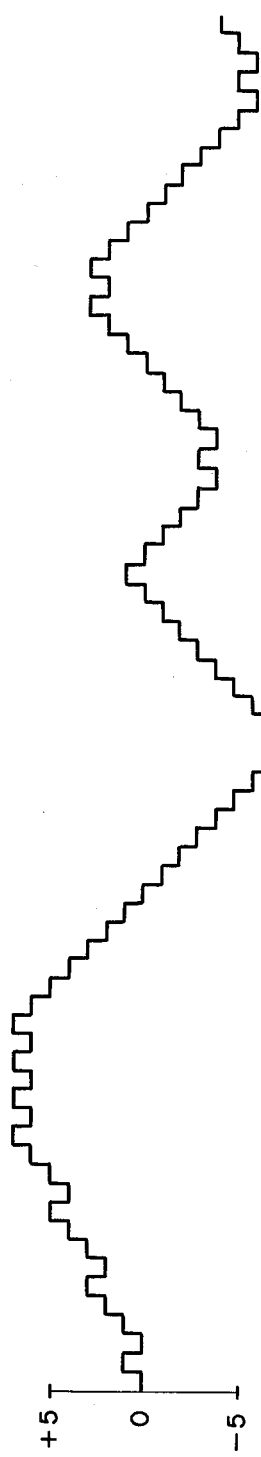

APPARATUS AND METHOD FOR DIGITAL COMBINATION OF DELTA MODULATED DATA

This is a continuation of application Ser. No. 892,353 filed May 31, 1978, now abandoned.

BACKGROUND OF THE INVENTION

1. Field of the Invention

The present invention relates to means and methods for the digital combination of a plurality of speaker voice channels and, in particular, to means for obtaining the combination of a plurality of delta modulated voice channels at the original speaker data bit rate.

2. Description of the Prior Art

Intercom systems, when employed for shipboard command and control and other military-type uses, must maintain secure interfaces with speaker and listener terminals. Often such security is achieved at a relatively high cost in terms of system complexity. Present day Naval intercom systems, for example, are secure when operated in the range of audio frequencies. It has been found that the maintenance of such security has complicated attempts to take advantage of digital voice transmission using delta modulation in such systems.

Delta modulation of voice data, presently utilized in transcontinental telephone systems, involves the transformation of a voltage waveform, which is the amplified output of a microphone, into a digital data bit stream. The bit stream consists of "ones" and "zeros". Transformation occurs by detecting the rate of change of the voltage waveform with respect to time. When this rate of change exceeds a positive threshold X the bit stream will contain consecutive "ones"; likewise, when the (negative value of) the rate of change of the voltage waveform with respect to time exceeds a (negative) threshold Y the bit stream will contain consecutive "zeros". When the rate of change does not exceed either the positive or negative threshold the bit stream consists of alternating "ones" and "zeros". Such an alternating bit stream is known as an "idle" waveform.

In the prior art two principal methods, a multiplex method and an analog method, have been employed for the conferencing of delta modulated digital data. In the former the multi-station voice data is multiplexed onto a bus at N-times the individual speaker bit rate (N is the number of speaker stations serviced). The greater-than-speaker bit rate data as multiplexed is then transmitted to the listening station(s).

The analog method involves the conversion of the delta modulated data from each individual speaker station to an analog waveform. The reconstituted analog waveforms are then mixed by conventional techniques. The composite analog waveform which is generated is then converted to delta modulated data for transmission to a listening station at the original delta modulated data bit rate.

The present invention accepts delta modulated voice data from multiple sources and performs multi-station combination while the data is encoded as digital data bits. The combined data is then converted to a single delta modulated line per listener. The data remains in a digital format within the system as all multiplexing operations are performed within a central switching unit. This allows the transmission of the combined data to the listening station(s) at the original delta modulated data bit rate. No conversion to analog waveform occurs within the system. By elimination of the conversion to an analog waveform the amount of system circuitry required is greatly reduced. The maintenance of the original delta mmodulation bit rate reduces the bandwidth of the transmitted output and thus enhances the security of the system.

SUMMARY OF THE INVENTION

Broadly, according to the preferred embodiment of the apparatus of the invention there is provided an intercom system to process delta modulated sound data as digital data bits comprising in combination a plurality of speaker stations, each of which transforms sound into encoded bipolar delta modulated data having bit rate R, a plurality of listener stations, each of which accepts encoded delta modulated data and transforms the data into sound, and a central switching unit which accepts the encoded delta modulated data from the plurality of speaker stations and digitally combined selected speaker stations for one or more of the listener stations so that the combined encoded delta modulated data has a bit rate R identical to that of the encoded bipolar delta modulated data of each of the speaker stations. As used herein, "bipolar data" refers to two-state logic data which, for example, includes streams of binary bits with each bit having either a "one" or a "zero" value.

The present invention embodied in the above apparatus comprises a method for combining the sound data of a plurality of speakers for a plurality of listeners by transforming the sound data from each of the speakers into bipolar delta modulated data having bit rate R, digitally combining selected speakers' delta modulated data according to the listeners' desired combinations so that each desired combination of delta modulated data has a bit rate R identical to that of the bipolar delta modulated data, then transforming each of the combinations of delta modulated data into the generated sound.

In a more specific aspect, there is provided apparatus for digitally generating a delta modulated waveform of bit rate R which represents the combination of a number of selected speaker locations (from a total of N) of a time division multiplexed tri-state bus. The apparatus includes in combinatin a listener module, an idle waveform generator and a data generator. The listener module determines whether the "ones" or "zeros" of the time division multiplexed tri-state bus are the more common among the selected speaker locations during a time slot. The idle waveform generator produces an idle delta modulated stream of digital data bits having the bit rate R and the data generator accepts the outputs of the listener module and the idle waveform generator and inserts either a "one" or a "zero" into the idle stream of digital data bits to produce the combination.

In yet another of its more specific aspects, this invention provides an apparatus for creating a combined waveform of bit rate R of speakers selected from among N speaker locations of a time division multiplexed stream by modifying an idle waveform having bit rate R according to the most common state ("one" or "zero") of the selected speakers within previous time periods. There is included, among the apparatus, a listener module and a data generator having a borrow register and a carry register. The listener module accepts the time division multiplexed stream and indicates when the majority bit of the selected speaker locations is "one" and when it is "zero" within a time period. The data generator accepts the majority bit data of the listener module and inserts a "one" into the idle waveform when the idle waveform is a "zero" and a "zero" into the idle waveform when the idle waveform is a "one" according to the majority bit outputs of the listener module during prior time periods. The carry regiter is incremented when the number of selected speaker-locations which are "ones" exceeds the number of location which are "zeros" during a speaker time period and the borrow register is incremented when the number of selected speaker locations which are "zeros" exceeds the number of locations which are "ones". The carry register is decremented at the end of a time period when the register is not empty and the idle waveform is at the "zero" level to reflect the insertion of a "one" into the waveform and the borrow register is decremented at the end of a time period when the register is not empty and the idle waveform is at the "one" level to reflect the insertion of a a "zero".

OBJECTS OF THE INVENTION

It is accordingly an object of the present invention to provide a method and apparatus for the digital combination of a plurality of delta modulated speaker stations without increasing the data bit rate of combined transmissions above that of the individual speaker stations.

Another object of the present invention is to provide a method and means for generating a combined delta modulated waveform of digital data bits by the modification of an idle waveform.

Stil another object of the present invention is to achieve the above object by a method and means capable of determining, and storing for insertion, bits reflecting historical speaker station data.

Yet another object of the present invention is to provide a method for creating a combination of delta modulated speaker stations at the speaker station data bit rate utilizing simplified circuitry.

Other objects, features and advantages will appear in the subsequent detailed description which is accompanied by drawings wherein like numerals throughout the figures indicate like parts.

BRIEF DESCRIPTION OF THE DRAWINGS

FIGS. 6(a) through 6(j) are waveforms principally to illustrate the time relationships of selected pulses produced by components of the system shown generally in FIG. 1 and more specifically in FIG. 5;

FIG. 7 is an illustration of the delta encoding of an analog waveform; and

FIGS. 8(a) and 8(b) illustrate the analog waveform of FIG. 7, delta encoded according to theory and according to the method of the present invention.

While the invention has been shown and will be described in some detail with reference to a preferred embodiment thereof, there is no intention that it thus be limited to such detail. On the contrary, it is intended here to cover all modifications, alternatives and equivalents falling within the spirit and scope of the invention as defined by the appended claims.

DESCRIPTION OF THE PREFERRED EMBODIMENT

Figure 1:
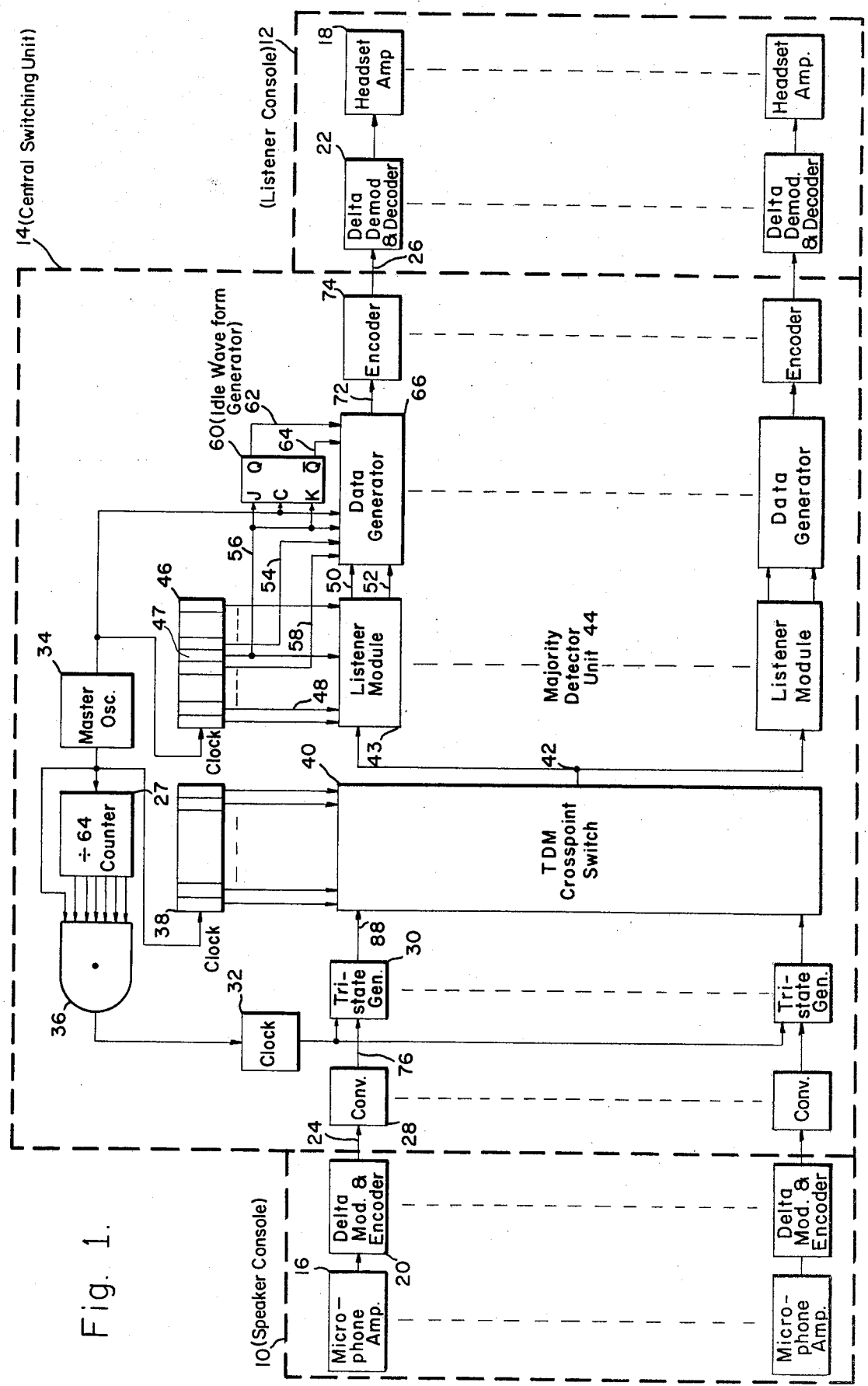
FIG. 1 is a schematic view of the intercom system of the present invention.

An intercom system according to the present invention is shown in FIG. 1. A (delta modulated) speaker console 10 is linked to a listener console 12 through a central switching unit 14. The intercom system as illustrated interconnects a maximum of sixty-four speaker-listeners, each of whom has access to a microphone/amplifier 16 and a headset amplifier 18, resulting in a total of sixty-four microphone/amplifiers 16 per the speaker console 10 and sixty-four headset amplifiers 18 per the listener console 12.

Each microphone/amplifier 16 accepts the mechanical air pressure variations generated by sound and acts as a transducer to produce voltages corresponding thereto. The output of each such microphone/amplifier 16 is fed to a delta modulator and encoder 20. Together the microphone/amplifier 16 and delta modulator and encoder 20 constitute one delta modulation speaker station of the speaker console 10. The delta demodulator and decoder 22, in conjunction with a headset amplifier 18, constitutes one delta modulation listener station of the listener console 12. It accepts delta modulated sound data encoded for transmission and converts it to an analog waveform compatible with the headset amplifier 18 so that the data is made audible to the listener. From the discussion to follow, it may be seen that the speaker console 10 and the listener console 12 are in fact commingled, that is, each operator (speaker/listener) operates both a speaker station and a listener station. In this manner, individual duplex conversations can be achieved among all speaker/listeners as a special case of the data combination to be described infra. While it is conceptually useful to illustrate the invention in this manner, the inventive features thereof are equally applicable to a "non-commingled" system involving "pure speakers" and "pure listeners".

Figure 2:
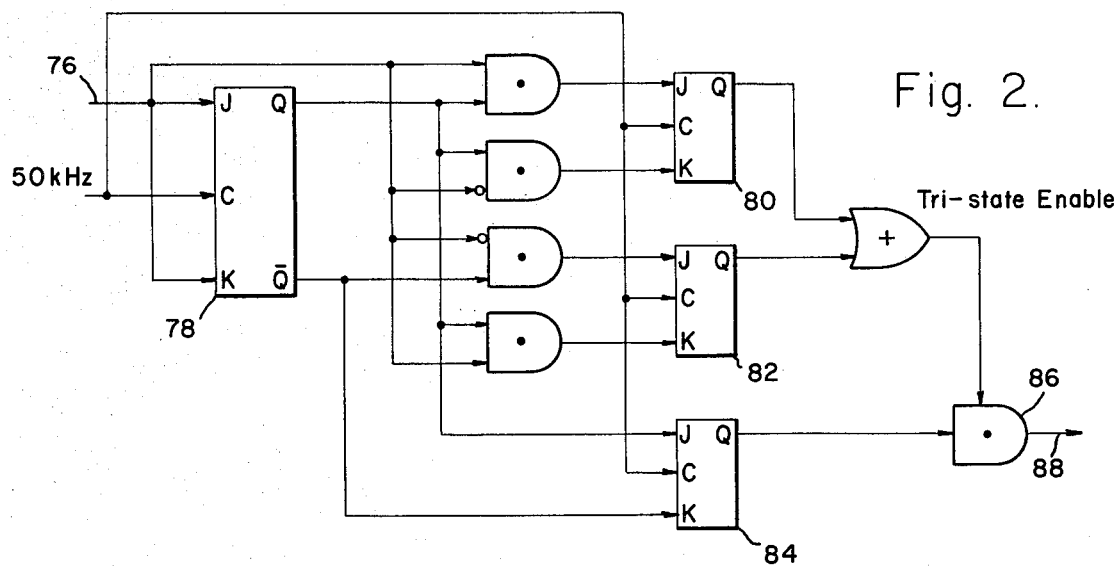
FIG. 2 is a diagram of a tri-state generator for the intercom system of FIG. 1.

The encoding of the digital data bits may involve any of a number of commonly utilized techniques for such transmissions including, but not limited to, pulse width, amplitude, f.m. and phase shift encoding. For example, the use of phase shift keyed Manchester encoding might be chosen to maximize line-to-line isolation of the "external" (with respect to the central switching unit 14) transmission links (the sixty-four speaking links such as the speaking link 24 serving the microphone/amplifier 12 and the sixty-four listening links such as listening link 26 serving the headset amplifier 18). Transmissions through th "external" links may be contained, as in the case of a coaxial cable, or may be free space involving for example r.f., optical or microwave energy. The output of the encoder 20 is received at the converter 28 of the central switching unit 14. The converter 28 demodulates the incoming signal to produce a non-return to zero (NRZ) waveform of digital data bits. This NRZ waveform is applied to one of a plurality of tri-state generators such as the tri-state generator 30. A detailed diagram of a tri-state generator is shown in FIG. 2. The tri-state generator 30 converts the incoming bipolar NRZ digital waveform of delta modulated information to a tri-state representation of the delta modulated data. Such a tri-state representation is highly desirable as the use of three "levels" allows a single ("one") bit to indicate $dv/dt > X$ (as opposed to consecutive "ones") and a single ("zero") bit to indicate $-dv/dt < Y$ (as opposed to consecutive "zeros"0. (The tri-state generator 30 is not enabled ("off") when an idle waveform is detected.) The tri-state generator 30, as utilized in the present invention, enables the simplification of all operations (and corresponding circuitry (which follow its conversion of the incoming bipolar data to tri-state with no loss of information content.

The tri-state generator 30 is gated by the (baseband) clock 32. The lock 32 is synchronous with the delta modulator and encoder 20 (as by the employment of a conventional phase lock loop to synchronize the delta modulator and encoder 20 to the clock 32) and has been chosen for purposes of illustration to have a clock frequency of 50 kHz, a frequency found to be compatible with human voice. It is generated from a 3.2 MHz master oscillator 34 by means of the divide-by-64 counter 27. An AND gate 36 is provided to maintain the pulses of the clock 32 identical in width to those of the master oscillator 34. The frequency of the master oscillator 34 is chosen to allow the time division multiplexing of the sixty-four stations of the speaker console 10 within the central switching unit 14. It is to be kept in mind that all multiplication of bit rate occurs internally and not along "external" links such as the speaking link 24 or the listening link 26. The security of the system is therefore not complicated by an increased transmission bandwidth as in prior art multiplex methods.

The master oscillator 34 clocks a 64 bit parallel ouput ring counter 38. The sixty-four outputs of the ring counter 38 are applied to a conventional ANDing type crosspoint switch 40. A "one" circulates within the ring counter 38 which is ANDed (this is not shown) successively within the switch 40 during each 50 kHz time slot. Such a switch 40 configuration is well known in the art. The output of the crosspoint switch 40 thus appars as a 3.2 MHz (64 times 50 kHz) multiplexed stream of digital data bits (including the "off" state) on the tri-state bus 42.

The digital data of the tri-state bus 42 is applied to a majority detector unit 44. One listener module 43 (of a plurality thereof ) of the majority detector unit 44 is illustrated in detail in FIG. 4. Each listener module 43 of the majority detector unit 44 is controlled by a listener address register 46. The register 46, which is clocked by the master oscillator 34 is a 64 bit ring counter which circulaates a single "one" bit and has 64 parallel outputs such as the output 48. The output of each listener module 43, as will be shown, infra, consists of two streams of bipolar data per listener module. These are a majority "ones" output such as that of the bus 50 and a majority "zeros" output such as that of the bus 52. The state of each output is a running comparison throughout each 50 kHz time period of selected speakers. The high ("one") level on the "majority ones" bus 50 is achieved when more of the speakers being chosen by a given listener have had a dv/dt since the end of the previous 50 kHz time period which exceeds the threshold value X than have had a $-dv/dt$ which is less than the negative threshold Y. Contrariwise, the level along the "majority zeros" bus 52 goes high when more of the selected speakers have a $-dv/dt$ which is less than the negative threshold Y. When all speakers are "idle" within a 50 kHz time period or the number of speakers exceeding the positive threshold equals those not exceeding the negative threshold, the data streams on the buses 50 and 52 are simultaneously low ("zero"). Thus the tri-state data input of the bus 42 is seen to emerge from the majority detector unit 44 in bipolar ("one" and "zero") form. The listener address register 46 is tapped by the three conductors 56, 54 and 58 at three addresses per listener. They are, respectively, the listener's own slot, the time slot of the next multiplexed speaker-listener and then slot of the preceding speaker-listener, that is, $t_n$, $t_{n+1}$, and $t_{n-1}$.

A flip flop 60 acts as an idle waveform generator. It will be seen infra that a single flip flop such as the flip flop 60 might be employed to provide idle waveform data for all listeners. However, a clear comprehension of the system can be more readily achieved if it is assumed that one waveform generator exists per listener as such comprehension is believed to be facilitated by the grouping of the overall system into listener components. The flip flop 60 is clocked by the master oscillator 34. The conductor 56, connected to the listener's own slot in the listener address register 46, is coupled to the J and K inputs of the flip flop 60. This assures that the flip flop 60 will toggle just once as the "one" bit is clocked at 3.2 MHz through the sixty-four cells of the listener address register 46, resulting in a 50 kHz idle waveform at the Q output and along the bus 62. The complementary data stream of the $\overline{Q}$ output appears along the bus 64.

An idle waveform (a 50 kHz portion of which is shown as FIG. 6h), as explained earlier, represents the bipolar delta modulated coding of a waveform having a dv/dt which neither exceeds a positive threshold X nor is less than a negative threshold Y. The complementary idle waveform, the aforementioned three conductors tapped from the listener address register 46, and the master oscillator 34 are applied to a data generator 66. The data generator 66, shown in greater detail in FIG. 5, inserts additional "ones" or "zeros" into the idle 50 kHz waveform according to the following algorithm:

$$DATA = \overline{QIDLE} \cdot BORROW + QIDLE \cdot \overline{CARRY}$$

Where BORROW and CARRY refer to the borrow register 68 and the carry register 70, to be discussed infra, of the data generator 66.

The above algorithm is designed to generate a combined (or singular as in the special case of single listener, single speaker communication) waveform by inserting "ones" and "zeros" into an otherwise idle (in terms of delta modulation) waveform. In this regard, noting that a "one" inserted where a "one" is already present in the idle waveform is "lost" data and vice versa, the algorithm and the related apparatus of FIG. 5 stores the data input from a listener module of the majority detector unit 44 until such time as the "one" or "zero" inserted into the idle waveform will alter the idle waveform and thus be reflected in the combined waveform generated. It will be noted from the fact that the output of the flip flop 60 is a 50 kHz stream of alternating "ones" and "zeros" and from the detailed discussion of the data generator 66 infra that the output of the data generator 66 is a 50 kHz stream of delta modulated data. That is, combined data at the speaker data bit rate is produced for external transmisson by the central switching unit 14 of the invention.

The delta modulated stream of combined data (there exists one data generator such as the data generator 66 per listener) is transferred on the line 72. This digital data bit stream is applied to an encoder 74 which converts the digital data for external transmission. The waveshape is transmitted along the listening link 26 to a selected listener station of the listener console 12 as discussed above.

Figure 3:
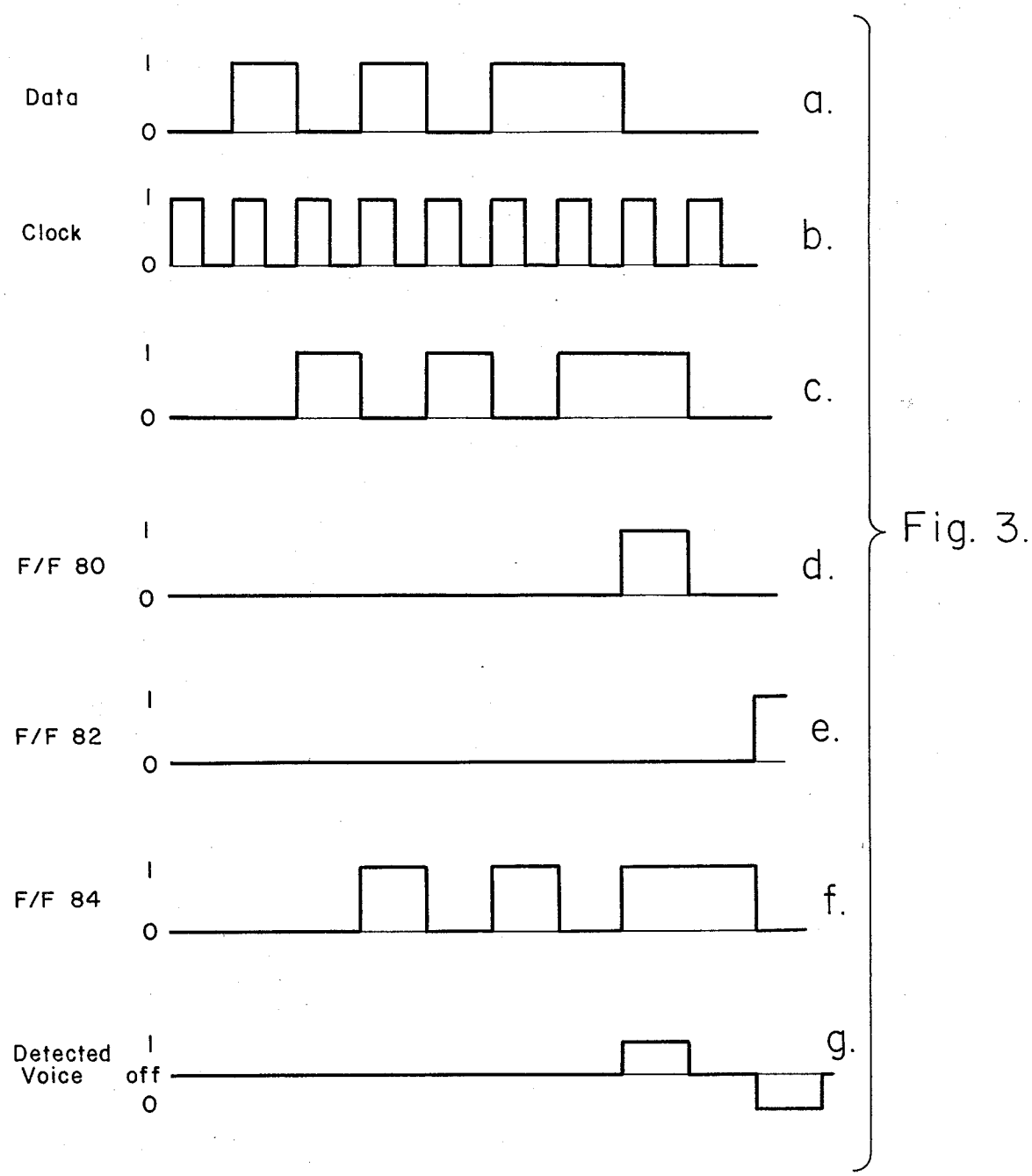
FIGS. 3(a) through 3(g) are timing diagrams illustrating the conversion of bipolar delta modulated data to tri-state data by means of the tri-state generator of FIG. 2.

A tri-state generator 30 is illustrated in detail in FIG. 2. A bipolar NRZ waveform of digital data bits such as that shown in FIG. 3a is input to the tri-state generator 30 on the bus 76, and the tri-state representation thereof generated according to the following algorithm:

J-Flip Flop 78=DATA
K-Flip Flop 78=$\overline{\text{DATA}}$
J-Flip Flop 80=(Q-Flip Flop 78).DATA
K-Flip Flop 80=(Q-Flip Flop 78).$\overline{\text{DATA}}$
J-Flip Flop 82=$\overline{\text{(Q-FLip Flop 78)}}$.$\overline{\text{DATA}}$
K-Flip Flop 82=$\overline{\text{(Q-Flip Flop 78)}}$.DATA
J-Flip Flop 84=Q-Flip Flop 78
K-Flip Flop 84=$\overline{\text{(Q-Flip Flop 78)}}$
Detected Voice=(Q-Flip Flop 80+Q-Flip Flop 82).Q-Flip Flop 84

The tri-state generator 30 is clocked by the 50 kHz baseband clock 32. The Q output of the flip flop 78 duplicates the NRZ input data with a shift of one (50 kHz) time period (FIG. 3c). The output of the flip flop 84 duplicates the data with an additional shift of one time period (FIG. 3f). The high output of the flip flop 80 indicates consecutive "ones" in the input data stream (as shown in FIG. 3d) while the high output of the flip flop 82 indicates consecutive "zeros" in the input data stream (as seen in FIG. 3e). The outputs of the various flip flops and logic gates are applied according to the preceding algorithm to a tri-state AND gate 86 to produce a stream of ternary data indicating detected voice. This stream is transmitted along a bus 88. In FIG. 3g there is shown the tri-level voice waveform generated by the above algorithm for the NRZ data of FIG. 3a.

Figure 4:
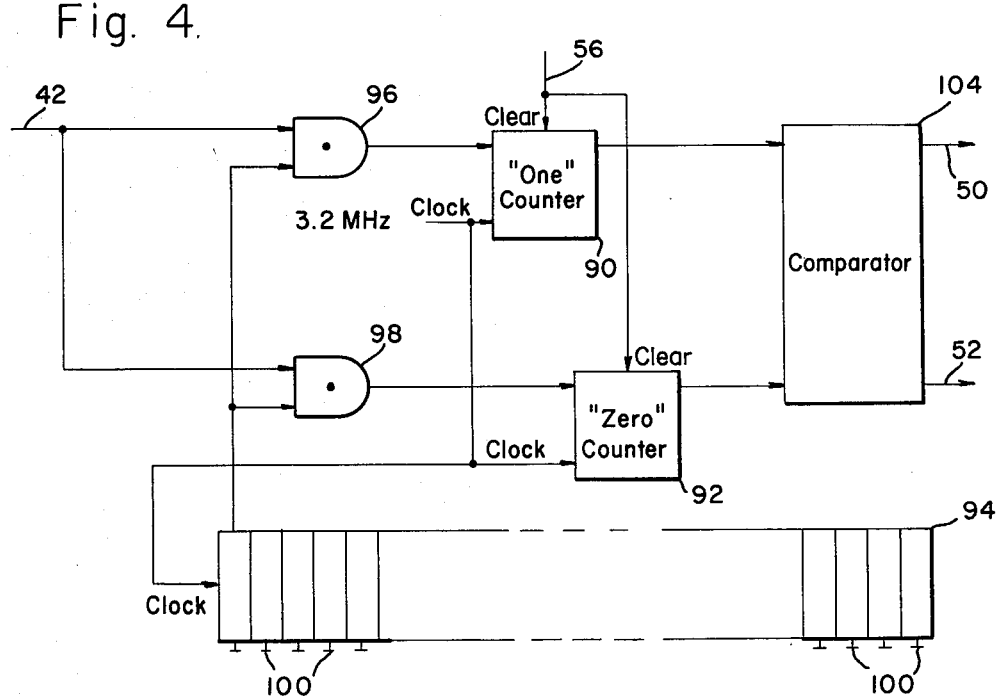
FIG. 4 is a diagram of one of a plurality of the listener modules of the majority detector of the intercom system of FIG. 1.

A typical listener module 43 of the majority detector unit 44 of the present invention is shown in greater detail in FIG. 4. The multipliexed tri-state data of the tri-state bus 42 is applied to a plurality of binary counter pairs, such as "one" counter 90 and "zero" counter 92. Each counter is clocked by the master oscillator 34, and operatively engaged to a speaker address register 94 through the AND gates 96 and 98 as shown. The speakeraddress register 94 is preset by the listener's selection of a number of the sixty-three preset buttons, shown collectively as 100, thereby determining a number of "one" bits circulating within the register 94 as a ring counter. Each preset "one" within the speaker address register 94 corresponds to one of the speakers chosen by the listener.

Figure 5:
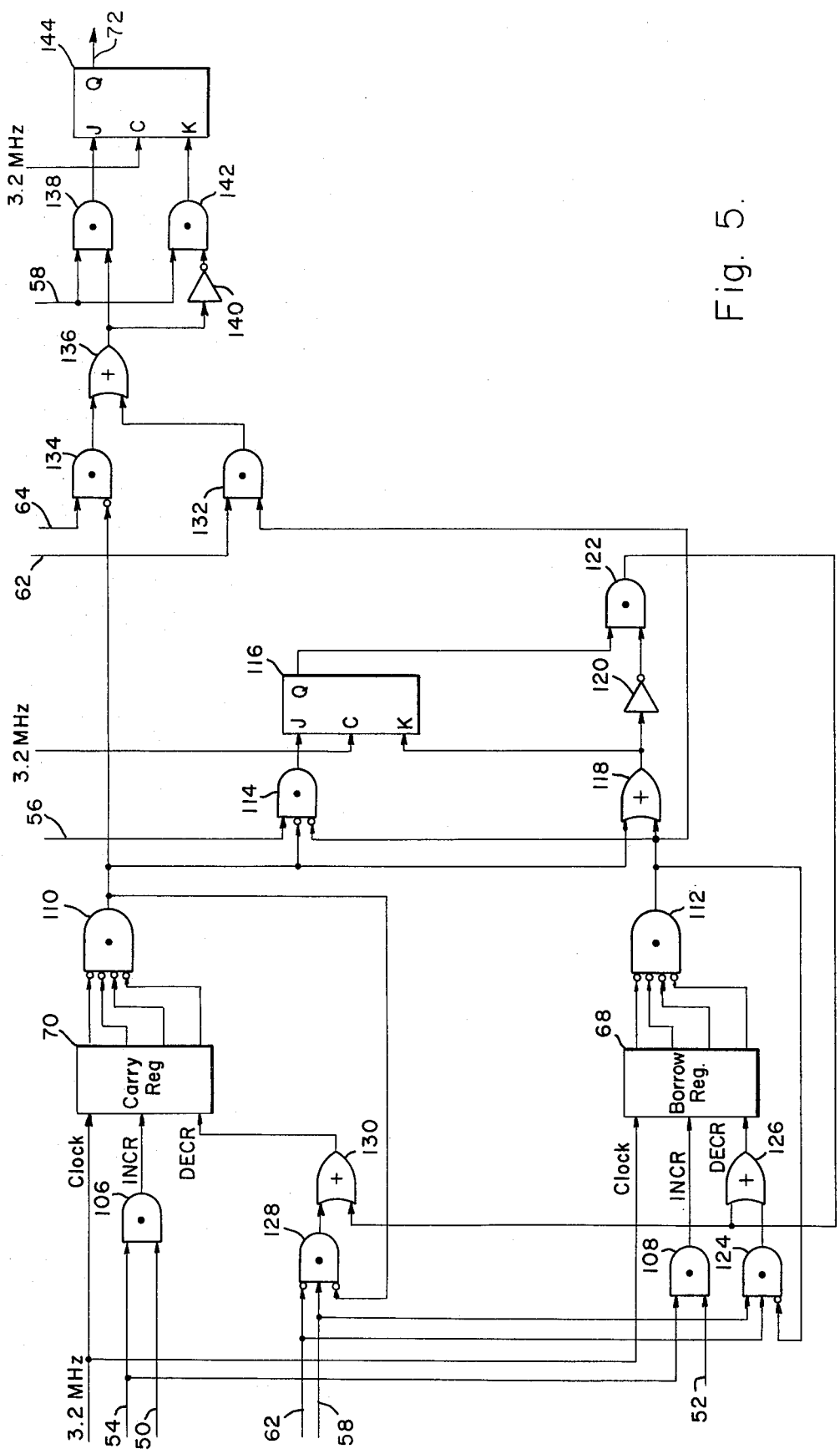
FIG. 5 is a diagram of a data generator of the present invention utilized in the inventive combination shown in FIG. 1.

The paired streams of bipolar digital data such as that of the "majority one" bus 50 and the "majority zero" bus 52 which emerge from the listener module 43 enter a listener's data generator 66, of FIG. 5. The "one" counter 90 and the "zero" counter 92 of the majority detector 44 are both cleared when the bus 56 which connects the listener's own speaker slot of the listener address register 46 goes high, which, of course, occurs on every sixty fourth count of the 3.2 MHz master oscillator 34. The contents of each counter are compared in a comparator 104 on a "running" count basis which is renewed at the end of every 50 kHz time period. This process may be observed in FIG. 6. The content of an assumed tri-state bus 42 is shown in FIG. 6c. Throughout FIG. 6 there is presented the operation of the present invention with respect to a listener (number 7) selecting every divisible-by-five numbered speaker. (As mentioned above every "speaker" is also a "listener" for purposes of the invention as illustrated.) The input to the "one" counter 90 and to the "zero" counter 92 are shown in FIGS. 6d and 6e, respectively. In FIGS. 6f and 6g there are shown the outputs of the comparator 104. FIG. 6f represents the "majority one" output along the bus 50 and FIG. 6g represents the "majority zero" output along the bus 52. It can be seen that the fifteenth speaker in the 50 kHz time period (which begins at the listener's own slot (number 7) is the first of the selected speakers after $t_n$ whose dv/dt exceeds either the positive (X) or negative (Y) threshold. Thus, in FIG. 6g the output along the "majority zero" bus 52 goes high at the leading edge of the "zero" counter input pulse at speaker position number fifteen. This output remains high (as the waveforms of speakers 20, 25, and 30 are seen to be idle) until speaker 35 who has a dv/dt which exceeds X. At this point the number of "zeros" equals the number of "ones" in the 50 kHz time period fo interest and thus the "ones" and "zeros" are offsetting in the running total. Hence, both the output along the "majority one" bus 50 and along the "majority zero" bus 52 are low. They remain low until speaker number 45, whose voice output has a dv/dt which exceeds X. Thus, at speaker slot 45 a majority of "ones" now exists in the running total being made within the 50 kHz time period. Therefore, the "majority ones" output along bus 50 goes high at the leading edge of the "one" pulse at speaker position number forty five, while the "majority zero" bus 52 remains low. The next sampled non-idled speaker is number 55. Once again, this speaker exceeds the positive dv/dt threshold and hence a majority of "ones" is maintained. Therefore the waveshapes of FIGS. 6f and 6g are unchanged. Finally speaker 5 is seen to have a dv/dt which is less than -Y. However a majority of "ones" still exists among the speakers of interest to listener number 7 during this 50 kHz time interval and therefore the output observed in FIGS. 6f and 6g remains until the clearing pulse of the listener address register 46 is applied at t to the "one" counter 90 and to the "zero" counter 92.

A listener data generator 66 is shown in detail in FIG. 5. Each listener data generator 66 is paired with a listener module 43 of the majority detector unit 44 and may be grouped functionally into a portion (the AND gates 106, 108, 110 and 112, the carry register 70 and the borrow register 68) which records the majority data of the listener module 43, a portion (the AND gates 114 and 122, the OR gate 118, the inverter 120 and the flip flop 116) which offsets majority "one" data with majority "zero" data and vice versa and a portion (the AND gates 124, 128, 132, 134, 138, and 142, the inverter 140, the flip flop 144, and the OR gate 136) which composes the combined waveform of digital data bits and makes corresponding reductions in stored majority data to reflect the insertion of "one" or "zero" data into the otherwise idle stream. The "majority one" bus 50 and the "majority zero" bus 52 of the listener module 43 are sampled once, at $t_n$, the listener's own location within a 50 kHz time period, by the dual input AND gates 106 and 108, an input of each of which is tied to the $t_n$ slot of the listener address register 46 by the conductor 56. The output of the AND gate 106 is applied as the "increment" signal to the up/down carry register 70 while the output of the AND gate 108 is applied similarly to the borrow register 58. Their data content reflects the presence of a majority of "ones" or a majority of "zeros" among the speakers chosen by a listener in previous 50 kHz time period. In FIG. 6i an increment pulse at $t_n$ (listener/speaker number 7's own slot) results from the majority of "ones" over the illustrated 50 kHz time period.

The contents of the (parallel out) carry register 70 and of the borrow register 68 are inverted and applied to the AND gate 110 and to the AND gate 112, respectively. The output of the AND gate 110 is high when the carry register 70 is empty and low when the carry register 70 is not empty, indicating a historical majority of "ones" during 50 kHz samples of the tri-state bus while the output of the AND gate 112 is high when the borrow register 68 is empty and low when the borrow register 68 is not empty, indicating a historical majority of "zeros". The outputs of the AND gates 110 and 112 are inverted and sampled at the beginning of the next 50 kHz time period by the three-input AND gate 114, an input of which is tied to the $t_{n+1}$ speaker slot of the listener address register 46 by the conductor 54. The output of the AND gate 114 is applied to the J input of the flip flop 116. The outputs of the AND gates 110 and 112 are combined in the OR gate 118 and applied as the K input to the flip flop 116. Therefore the J input of the flip flop 116 is high when neither the carry register 70 nor the borrow register 68 is empty while the K terminal of the flip flop 116 is high only when at least one of the aforementioned registers is empty.

The flip flop is clocked at 3.2 MHz by the master oscillator 34. Its output is low when at least one of the aforementioned registers is empty and goes high at speaker location $t_{n+2}$ (as shown in FIG. 6f) if neither register is empty. It will be seen that the high output level of the flip flop 116 serves to activate the "decrement" signals of both registers with the goal of cancelling the excess "ones" data of the carry register 70, as incremented, with the majority "zeros" data of the borrow register 68, as incremented, and vice versa during each 50 kHz time frame.

The outputs of the flip flop 116 and of the OR gate 118 (as reversed by the inverter 120) are applied to the AND gate 122. The and gate 122 is low when one of the registers is empty and goes high, at $t_{n+2}$, when neither register is empty. The inverted output of the AND gate 112 (indicating the presence or absence of data in the borrow register 68) and the idle waveform (FIG. 6h) of the bus 62 are combined at the end of the 50 kHz time period by their application along with the conductor 58 (which taps the listener address register 46 at speaker slot $t_{n-1}$) to the AND gate 124. The output of the AND gate 124 is then combined with the output of the AND gate 122 in the OR gate 126 to provide the "decrement" signal to the borrow register 68. Therefore, a borrow register 68 "decrement" signal results from the presence of data in both the carry register 70 and the borrow register 68 (the AND gate 122 output going high) during a 3.2 MHz clocking through of a 50 kHz time period or the concurrence of some data in the carry register 68 at the end of a 3.2 MHz clocking through of a full 50 kHz time period ($20\mu$ sec) and the high level of the idle waveform (the AND gate 124 high). It will be seen, infra, that the latter instance coincides with the insertion of a "zero" into the idle waveform.

A similar process controls the carry register 70. The inverted output of the AND gate 110 and the inverted field waveform are applied along with the conductor 58, which taps the listener address register 46 at speaker $t_{n-1}$, as inputs to the AND gate 128. The AND gate 128 is high at $t_{n-1}$ if the idle waveform is low and the carry register 70 is not empty and is applied, along with the output of the AND gate 122, discussed supra, to the OR gate 130 to provide the "decrement" signal to the carry register 70. Thus a non-empty carry register 70 will decrement to reflect either insertion of a "one" into a low idle waveform (output of AND gate 128 high) or the offsetting of information stored in a non-empty borrow register 68 (output of the AND gate 122 high).

The borrow register 68, clocked by the 3.2 MHz master oscillator 34, is seen to increment when the AND gate 108 is high (indicating that, over the previous 50 kHz time period, the number of speakers of interest to the particular listener having a $dv/dt < -Y$ exceeded the number of such speakers having a $dv/dt > X$) and to decrement when the borrow register 68 is not empty and the idle waveform is high at the end of the 50 kHz time slot (output of the AND gate 124) or neither the carry register 70 nor the borrow register 68 is empty. The implication of this operation is that the borrow register 68 records the instances (50 kHz time period) wherein the number of "zeros" exceeds the number of "ones". This information, stored in the borrow register 68, will be inserted as additional "zeros" in the idle waveform generated by the flip flop 60 when there is a larger count in the borrow register 68 than in the carry register 70 (indicating a historical majority of "ones" over "zeros") and the idle waveform is otherwise high so that the inserted "zero" will not be wasted. When the above conditions are achieved, the insertion of a "zero" or the removal of a "zero" for the purpose of offsetting or cancelling out "ones" information stored in the carry register 70 will be reflected in the depletion or removal of one bit of information from the borrow register 68. The converse governs the content of the carry register 70.

The 50 kHz idle waveform is combined with the output of the AND gate 112 in the AND gate 132, the output of which is high when the idle waveform generated by the flip flop 60 is high and the borrow register 68 is empty. The complement of the idle waveform is combined with the complementary output of the AND gate 110 in the AND gate 134. The output of the AND gate 134 is high when the idle waveform is low and the carry register 70 is not empty. The outputs of the AND gates 132 and 134 are applied to the OR gate 136. The output of the OR gate 136, when high, indicates that the resultant combined waveform should be high. That is, either the idle waveform is high and the borrrow register 68 is empty (AND gate 132 high) or the idle waveform is low and the carry register 70 is not empty (AND gate 134 high).

The output of the OR gate 136 is applied to the AND gate 138 along with the ($t_{n-1}$) conductor 58 and is inverted by the inverter 140 and combined with the conductor 58 in the AND gate 142. The output of the AND gate 138 is applied to the J input of the flip flop 144 and the output of the AND gate 142 is applied to the K input of the flip flop 144 which is clocked by the 3.2 MHz master oscillator 34. The flip flop 144 provides NRZ data, capable of change at a 50 kHz rate. The J input of the flip flop 144 is high at $t_{n-1}$ when the output of the AND gate 134 is high (indicating a "one" is to be removed from the carry register 70 and inserted into the idle waveform) or the input from the AND gate 132 is high (indicating that there are no excess "zeros" to modify the high portion of the idle waveform). (The concurrence of the "decrement" signal from the AND gate 128 and the "insert one" signal from the AND gate 138 may be seen by tracing the "insert one" signal back to the AND gate 134. The inputs to the AND gate 134 are the complement of the idle waveform and the complement of the AND gate 110. This ANDed combination is sampled at speaker location $t_{n-1}$ by means of the AND gate 138. These three signals also comprise the inputs to the AND gate 128. Thus the coincidence of the two processes, insert "one" and decrement the carry register 70 to note data removal, is demonstrable. It can be similarly shown that the same relationship occurs between the "zero" insert and borrow register 68 decrement signal.) When neither condition occurs, the K input to the flip flop 144 goes high and the J input goes low, an indication that either the low state of the idle waveform is to pass through the data generator 66 unaltered by any excess of "ones" data in the carry register 70 (output of the AND gate 134) or that the high state of the idle waveform is to be altered by information stored in the borrow register 68 reflecting excess "zeros" (output of the AND gate 132).

In summary, the data generator 66 accepts the "majority ones" and "majority zeros" data of a listener module 43 of the majority detector unit 44. Three speaker locations of the sixty-four within the time division multiplexed bus are sampled for the timing of operations. At speaker location $t_n$, that of the listener (number 7 in the example of FIG. 6), the majority bit of the speakers over the preceding 50 kHz time period is determined and one bit of data accordingly entered into either the borrow register 68 or the carry register 70. At speaker location $t_{n+1}$ (speaker 8 in FIG. 6) the data generator determines if both registers contain data. If so, they will be simultaneously decremented at $t_{n+2}$. Because only one bit of "majority one" or "majority zero" data can be incremented into either register per each 50 kHz time period it can be seen that, while one of the registers may accumulate data, the other register (reflecting fewer historical majority time periods) may accumulate only one bit of data which will be emptied promptly by the simultaneous decrementing at $t_{n+2}$ of both registers. Therefore, if the one bit of majority data entered at $t_n$ should represent that of the lesser (empty) register, that register will be emptied by the 3.2 MHz clocking of a decrement pulse to each register at $t_{n+2}$. Finally at speaker $t_{n-1}$ (speaker 6 in FIG. 6), located at the end of a clocking through (cycle) of all 64 speaker locations initiated by the incrementing pulse at the listener's own location $t_n$, the register containing data will be decremented if a bit of its stored data can be inserted into the otherwise idle waveform to generate the combined digital waveform.

The generation of delta modulated digital data bits according to the method and system of the present invention (neglecting, for simplification, all aspects of data combination) may be viewed in FIGS. 7 and 8. In FIG. 7, a waveform varying in frequency from 781.25 Hz to 3.125 kHz is encoded into digital data bits of delta modulation indicated below the waveform. The bit rate of the digital data is maintained throughout the variation of frequency. The corresponding analog waveform reconstructed from the detal modulated data bits is shown as FIG. 8a, which can be seen to closely approximate the waveform of FIG. 7. Beneath FIG. 8b are shown (1) the tri-state encoding of the bipolar data, (2) the idle waveform, (3) the resultant status of the carry register 70, (4) the borrow register 68, and (5) the stream of digital data bits representing the continuous waveform of FIG. 7 encoded according to the method of the data generator 66 of the present invention. That is, the waveform has been recreated by inserting "ones" or "zeros" into an otherwise idle waveform at the first appropriate time slot (when a bit of the opposite character would normally appear in the idle waveform). When both registers contain data, their contents are cancelled and bits entered into the idle stream only from the remainder. Single-headed arrows indicate the transfer of data from register storage into an appropriate period of the idle waveform. Double-headed arrows indicate the cancelling of data among contemporaneously non-empty registers. The reconstructed analog waveform represented by the data is shown in FIG. 8b. A comparison of this waveform to that of FIG. 8a indicates that a predictable phase shift and dc offset is induced by the generation of data by insertions into an idle waveform. Compensation for the dc offset may be obtained by the use of an ac coupled amplifier at the listener's headset amplifier 18. The phase shift is a function of the bit pulse width and the amount of data accumulated in a single register for insertion, when proper, into the idle waveform and may be reduced with an increase in bit rate.

From the foregoing, it is seen that there has been brought to the art of digital communications a system and method for digitally combining a plurality of delta modulated speaker stations while maintining all transmissions at the speaker data bit rate.

By means of a system incorporating the invention a listener may combine a number of speakers by presetting the location of the speakers of interest into a speaker address register. As various speakers converse, the resultant majority delta modulated bit of the preset speakers is determined over a time period and applied to increment a data generator from which majority bits are removed when appropriate and inserted into an otherwise idle waveform to create a digital combination of the selected speaker locations.

Furthermore, the method and system of the present invention utilize all states of tri-state as information to effect economy of total circuitry.

What is claimed is:

1. An intercom system to process delta modulated sound data as digital bits, comprising in combination:
   (a) a plurality of speaker stations, each of which transforms sound into encoded bipolar delta modulated data having bit rate R;
   (b) a plurality of listener stations, each of which accepts encoded delta modulated data and transforms said data into sound; and
   (c) a central switching unit of a plurality of receiver means for accepting said encoded bipolar delta modulated data and transforming said bipolar delta modulated data to a tri-state stream of digital data wherein the "one" state of the stream indicates consecutive "ones", the "zero" state of the stream indicates consecutive "zeros", and the "off" state of the stream indicates alternating "ones" and "zeros" of said encoded bipolar delta modulated data, wherein said central switching unit accepts said encoded delta modulated data from said plurality of speaker stations and digitally combines the data of selected speaker stations for one or more of said listener stations so that the combined encoded delta modulated data has a bit rate R identical to that of said encoded bipolar delta modulated data of said speaker stations.

2. The intercom system of claim 1 further characterized in that the central switching unit additionally comprises:

(a) multiplex means for time division multiplexing said tri-state stream of digital data onto a tri-state bus:
(b) a majority detector having a plurality of listener modules to accept said bus, each listener module of said majority detector having a "majority ones" output and a "majority zeros" output, said "majority ones" output being high when the data state corresponding to a majority of said selected speaker stations of said bus is "one" and said "majority zeros" output of said bus being high when the data state corresponding to a majority of said selected speaker stations of said bus is "zero";
(c) an idle waveform generator for generating a bipolar data stream of alternating "ones" and "zeros";
(d) a plurality of listener data generators, each of which accepts the "majority ones" and "majority zeros" output of one of said listener modules and said alternating stream of "ones" and "zeros" from said idle waveform generator and inserts a "one" or "zero" digital data bit into said stream of alternating "ones" and "zeros" in accordance with the identity of the majority of said states among said selected speaker stations of said tri-state bus to produce a combined stream of digital data bits; and
(e) a plurality of encoders each of which accepts the combined stream of digital data bits from a data generator and encodes said stream for transmission.

3. The intercom system of claim 2 further characterized in that each of said speaker stations comprises a microphone/amplifier and a delta modulator and encoder wherein an analog voltage waveform is generated by said microphone/amplifier and is applied to said delta modulator and encoder to produce an encoded delta modulated representation of said analog voltage waveform.

4. The intercom system of claim 2 further characterized in that each of said listener stations comprises a delta demodulator and decoder and a headset amplifier, said delta demodulator and decoder being responsive to the encoded stream of data of an encoder of said central switching unit to transform said stream into an analog voltage and said headset amplifier being responsive to said analog voltage to transform said voltage into sound.

5. Apparatus for digitally generating a delta modulated waveform of bit rate R representing a combination of data of selected speakers from among N speakers time division multiplexed onto a stream of data having a "one" state, a "zero" state and an "off" state, said stream data having rate NR, said apparatus comprising:
(a) a controlled listener module to determine whether the "ones" or "zeros" of the stream are more common among the selected speakers during a time period;
(b) an idle waveform generator to produce an idle delta modulated stream of digital data bits of alternating "ones" and "zeros" having the bit rate R; and
(c) a controlled data generator which accepts the outputs of said listener module and said idle waveform generator and inserts either a "one" or a "zero" into said idle stream of digital data bits to produce the combination of data.

6. The apparatus of claim 5 further characterized in that the data generator inserts either a "one" or a "zero" into said idle stream of digital data bits according to the bit state of the idle stream and the identity of the more frequent data state "one" or "zero", of said stream of data during prior time periods.

7. The apparatus of claim 6 further characterized in that the data generator removes "ones" or "zeros" information when a corresponding bit is inserted into said idle stream to form said combination waveform of digital data bits.

8. Apparatus for creating a combined delta modulated waveform of digital data bits having bit rate R representing selected speakers from among N speaker locations of a time division multiplexed stream of all N speakers by modifying an idle waveform having bit rate R according to the most common state ("one" or "zero") of said selected speakers within previous time periods which comprises:
(a) a listener module to accept the time divison multiplexed stream, said listener module having a "majority ones" output and a "majority zeros" output, said "majority ones" output being high when the majority of said selected speaker locations are "ones" and said "majority zeros" output of said listener module being high when the majority of said selected speaker locations are "zeros" within a time period;
(b) a data generator to accept the "majority ones" and "majority zeros" outputs of the listener module and to insert a "one" into said idle waveform when said idle waveform is a "zero" and to insert a "zero" into said idle waveform when said idle waveform is a "one" according to said outputs of said listener module during prior time periods;
(c) said data generator having a carry register and a borrow register, said carry register being incremented when the number of selected speakers having data state "one" exceeds the number of selected speakers having data state "zero" during a time period and said borrow register being incremented when the number of selected speakers having data state "zero" exceeds the number of speakers having data state "one" during a time period;
(d) said carry register being decremented at the end of a time period when said register is not empty, and said idle waveform is at the "zero" level to reflect the insertion of a "one" into said "waveform" and
(e) said borrow register being decremented at the end of a time period when said register is not empty and said idle waveform is at the "one" level to reflect the insertion of a "zero", whereby said combined delta modulated waveform of digital data bits is generated.

9. A method for combining the sound data of a plurality of speakers for a plurality of listeners, comprising the steps of:
(a) transforming said sound data from each of said speakers into bipolar delta modulated data having bit rate R;
(b) digitally combining selected speakers' delta modulated data according to said listeners' desired combinations so that each desired combination of delta modulated data has a bit rate R identical to that of said bipolar delta modulated data;
(c) transforming said bipolar delta modulated data into a tri-state stream of digital data wherein one bit state of the stream indicates consecutive "ones", another bit state of the stream indicates consecutive "zeros" and the third bit state of the stream indicates alternating "ones" and "zeros" of said bipolar delta modulated data; and then (d) transforming each of said combinations of delta modulated data into audible generated sound.

10. The method of claim 9 further characterized in that the digital combining of selected speakers' delta modulated sound data additionally comprises the steps of:

(a) multiplexing said tri-state stream of digital data onto a tri-state bus;

(b) detecting when a majority of "ones" or a majority of "zeros" exists among selected speaker locations of said tri-state bus for a given listener;

(c) generating an idle waveform of alternating "ones" and "zeros", and (d) producing a combined stream of digital data bits by inserting a "one" or a "zero" digital data bit into said idle waveform according to the majority state among said speaker locations of the tri-state bus as selected by a given listener.

* * * * *